United States Patent Office.

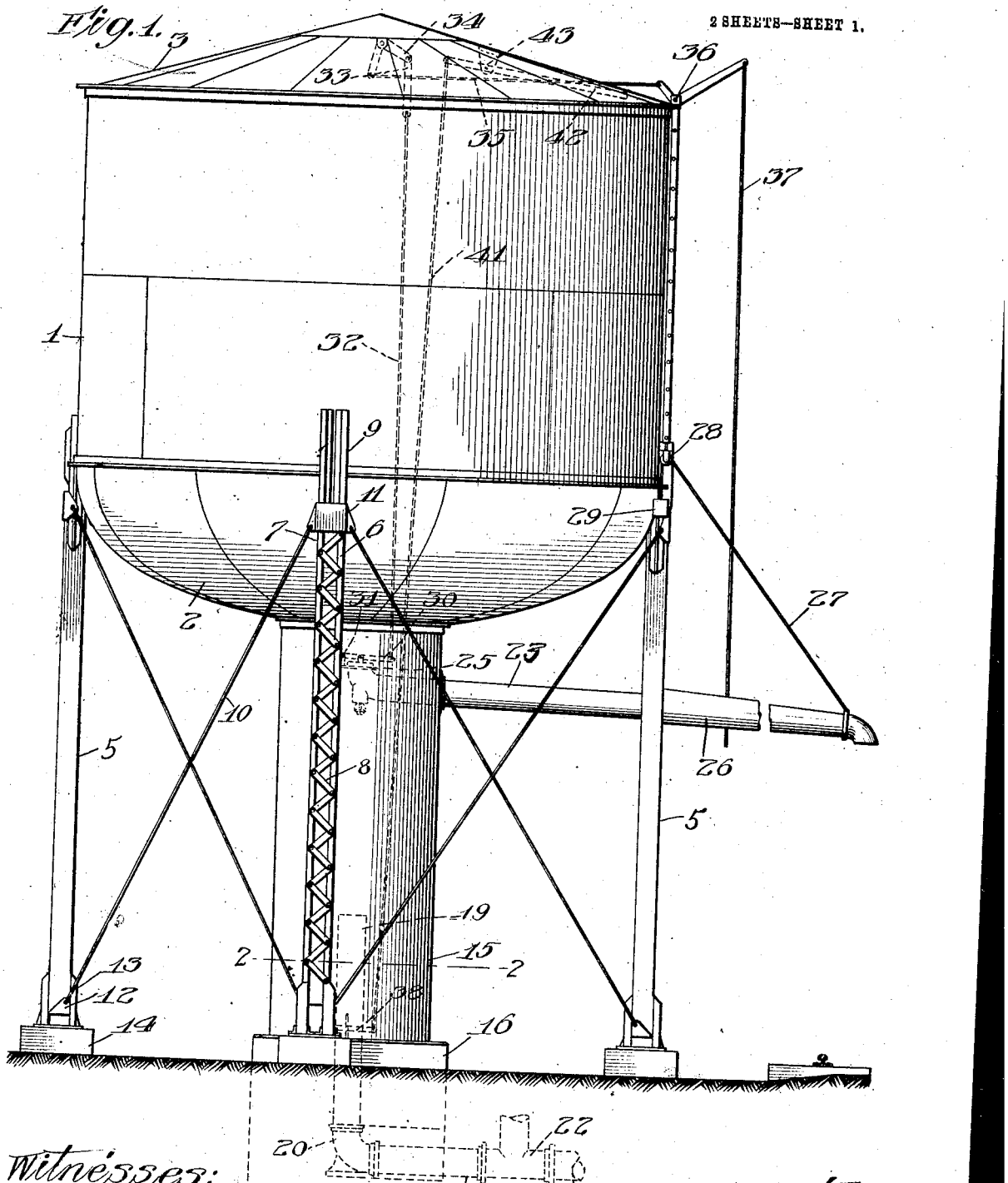

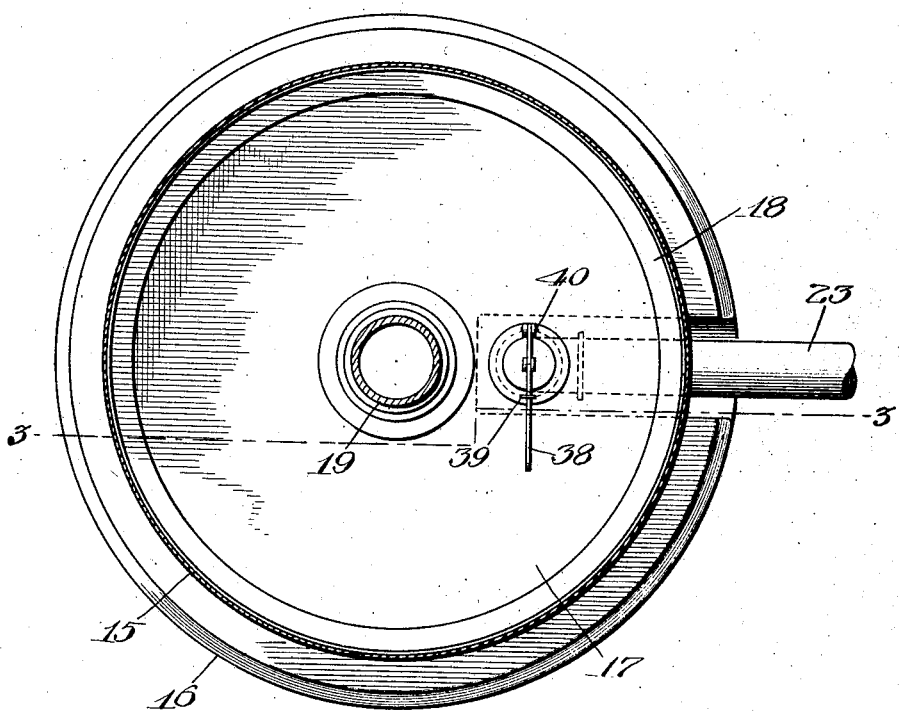
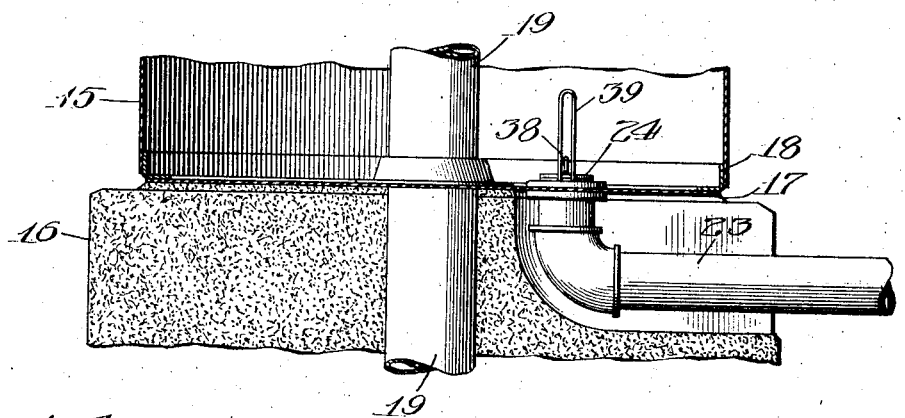

GEORGE T. HORTON, OF CHICAGO, ILLINOIS.

WATER-TANK.

No. 857,626.

Specification of Letters Patent.

Patented June 25, 1907.

Application filed March 6, 1905. Serial No. 248,691.

*To all whom it may concern:*

Be it known that I, GEORGE T. HORTON, a citizen of the United States, residing at Chicago, in the county of Cook and State of Illinois, have invented new and useful Improvements in Water-Tanks, of which the following is a full, clear, concise, and exact description, reference being had to the accompanying drawings, forming a part of this specification.

My invention relates to improvements in water tanks, and more particularly to that class of tanks for supplying water to railway engines.

Practically all the steel tanks which have been built heretofore have been of two types, those having the flat bottom and those having hemispherical bottoms. When a hemispherical bottom tank and a flat bottom tank of economical dimensions and the same capacity are compared it will be seen that the total depth of the hemispherical bottom tank is considerably greater than that of the flat bottom tank. Therefore when, as in railway service, the bottom of the two tanks must be at the same elevation and the elevation of the top of the tank is desired to be as low as practicable, in order to reduce the average head against which the water must be pumped, the flat bottom tank will be the more desirable. To off-set this, however, the hemispherical bottom tank has the advantage of requiring no floor system of heavy beams to support the weight of the water, also any sediment will seek the lowest level and will therefore be confined to a minimum space and further when necessary to remove this sediment it can be drawn out by the opening of a valve in the bottom without emptying the entire tank. The total height of the hemi-ellipsoid bottom tank as compared with a flat bottom tank of the same capacity is so nearly equal that there is no particular difference and all the advantages of the hemispherical bottom tank just mentioned are retained.

In my present invention, by constructing the bottom of the tank in the form of a hemi-ellipsoid and supporting the center of the bottom by means of the inlet pipe, I am enabled to combine the advantages of flat bottom and hemispherical tanks as above mentioned.

A further object of my invention is to provide a tank of this character with an inlet pipe, which will not freeze in extremely cold weather, and thereby avoid the necessity of building a frost-proof casing around the inlet pipe. A still further object of my invention is to so construct the inlet pipe that the same acts as a settling basin and when dirty water is encountered the sediment may be allowed to settle in the bottom of said inlet pipe and be drawn off therefrom without emptying the tank.

I have illustrated the preferred embodiment of my invention in the accompanying drawings, in which Figure 1 is an elevation of my tank; Fig. 2 is an enlarged sectional view of the inlet pipe, taken on the line 2—2 of Fig. 1; and, Fig. 3 is an enlarged detail section, taken on the line 3—3 of Fig. 2.

In the preferred embodiment of my invention, the tank 1 is preferably constructed of sheet metal and is cylindrical in form. A hemi-ellipsoid bottom 2 is provided which is also formed of sheet metal and is connected to the tank in any suitable manner. In forming the bottom it will be noted that the depth thereof is considerably less than the diameter. A top 3 is also provided, which is substantially cone-shaped, and is formed of sheet metal plates as is the rest of the tank. Supporting legs 5, comprising channel bars 6 and 7, having suitable lacings 8 connecting the same together, are provided and these supporting legs are preferably attached to the sides of the tank 1, by means of connecting angles 9, which are riveted to the sides of the tank in any suitable manner, and are riveted also to the channel bars 6 and 7. Suitable braces 10 are fastened at their upper ends to plates 11, secured to the supporting legs, and at their lower ends to plates 12, secured to the lower ends of the supporting legs. The lower ends of the supporting legs rest upon stone or cement blocks 14 and have secured thereto angle pieces 13, which distribute the weight upon the blocks. In this manner a strong and rigid support is provided for the tank, which will sustain the weight of the same after it is filled with water.

A large central inlet pipe 15 extends between the central portion of the bottom to a suitable base or support 16. This pipe is varied in diameter according to the climate of the vicinity in which the structure is located, but is at all times made of such size that the water contained therein will not entirely freeze up. By making this pipe large in diameter, while a portion of the water contained therein may freeze, there is always a center opening left which permits the water to be fed to the tank. The lower portion of this pipe is constructed substantially as shown in Fig. 3. A bottom 17 is adapted to rest upon the base 16 and is connected with the sides of the pipe by means of the angle-piece 18, which forms a water tight joint between the two sections. An opening is formed centrally of the bottom, through which is adapted to pass the supply pipe 19. This pipe preferably extends downwardly through the cement base 17 and is provided with an elbow 20, whereby the same is connected with a supply pipe 21, a suitable T-joint 22 being formed in said pipe for the purpose of connecting the same with the water main or other water supply. It will be noted that this pipe is of sufficient length to extend partially up into the inlet pipe 15. A second opening is formed in the bottom of the inlet pipe, which communicates with a blow-off pipe 23, a suitable valve 24 being seated in the opening in the inlet pipe which normally maintains the blow-off pipe closed.

At the upper end of the inlet pipe and near the bottom of the tank, is provided a discharge pipe 25, which enters through an opening in the inlet pipe and extends to the center of said pipe, as shown. A valve 25 serves to normally maintain this pipe in a closed position, except when it is desired to supply water to an engine. The pipe 25 communicates with a suitable water spout 26, by which water is supplied to the engine. This water spout is preferably pivoted to one of the legs of the tank and projects beyond the same over the tracks, in order that an engine running on the tracks may run beneath the spout and receive water therefrom. Normally the spout is maintained in a substantially upright position, a suitable chain 27 being connected to the outer end thereof and adapted to pass over pulleys 28, secured to the water tank, being connected at its opposite end to a weight 29, whereby the spout is held in an upright position. When it is desired to feed water to the engine, this spout may be lowered until the same is in a position to deliver water to the opening in the engine tank.

The valve 25 is normally closed and I have provided suitable means for opening the same when it is desired to supply water to the engine. The valve 25 is connected at its upper end to a lever 30, one end of which is pivoted upon a suitable support 31 and the other end of which is connected by a chain 32 passing through the tank and connected by the link 33, with one end of a bell crank lever 34, pivoted in the top 3. The other end of the bell crank lever is connected by a chain or cable 35, with a second bell crank lever 36, pivoted upon the outside of the tank. One end of the bell crank lever 36 has depending therefrom a pull chain or cable 37, which extends down within convenient reach of a person standing upon the tender of an engine. When the engine is in position to receive water from the discharge spout 26, the engineer or attendant, by pulling upon the cable 37, will open the valve 25 and permit the water to rush through the discharge pipe 25 and spout 26 into the water tank of the engine.

The blow-off valve 24 is operated from a lever pivoted in the roof of the tank. A suitable lever 38 extends through a slotted projection 39, connected with the blow-off valve and has one end pivoted as at 40. The opposite end of this lever is connected by means of a chain or cable 41, with a lever 42, pivoted at 43, within the top 3. This lever is operated to open the blow-off valve when desired, and access may be obtained to the lever by any suitable means, as through a door in the top of the roof.

In event it is desirable to use a crane connection with the tank and have the tank situated some distance from the track, the supply pipe 21 may be provided with an extension 44, which leads to the crane spout, the supply pipe being then used as a discharge pipe, as well as for supplying water to the tank. By having the supply pipe extending up some distance into the inlet pipe, it will be noted that when the water is drawn off, sediment which may settle in the bottom of the inlet pipe will not be drawn off with the same.

By the arrangement of the blow-off pipe 23, and valve 24, in the bottom of the inlet pipe 15, it will be seen that all mud and other sediment in the water will settle in the bottom of the inlet pipe and by opening the valve 24, this mud may be readily blown out by the force of the water rushing through the valve, whereby it becomes unnecessary to empty the entire tank to remove the sediment as is the case where the sediment is allowed to settle in the bottom of the tank, instead of in the bottom of the inlet pipe. Furthermore, by constructing the inlet pipe large in diameter the same affords an ample support for the bottom, other supporting means being unnecessary, and at the same time the large diameter of the pipe prevents freezing thereof in extremely cold weather, avoiding the necessity of building a frost-proof pipe around the casing as is frequently the practice.

Having thus described my invention what I claim as new and desire to secure by Letters Patent is:

1. The combination with a water tank, having a hemi-ellipsoid bottom, of an inlet pipe for said tank, said inlet pipe also serving as a support for the bottom of the tank.

2. The combination with a water tank, having a substantially hemi-ellipsoidal bottom, of suitable supports for said tank, and an inlet pipe entering the bottom of said tank and also serving as a support for the same.

3. The combination with a water tank, having a substantially hemi-ellipsoidal bottom, of an inlet pipe for said tank, said pipe serving as an additional support for the bottom of the tank and as a settling basin.

4. The combination with a water tank, having a substantially hemi-ellipsoidal bottom, of an inlet pipe for said tank, said pipe also serving as a support for the bottom of the tank, and a supply pipe entering said inlet pipe.

5. The combination with a water tank, having a substantially hemi-ellipsoidal bottom, of an inlet pipe therefor, said pipe also serving as a support for the bottom of the tank, and a supply pipe entering said inlet pipe at the bottom thereof and extending partially up into said pipe.

6. The combination with a water tank, having a substantially hemi-ellipsoidal bottom, of an inlet pipe for said tank, said pipe also serving as a support for the bottom of said tank, and a blow-off valve arranged in the bottom of said pipe.

7. The combination with a water tank, having a substantially hemi-ellipsoidal bottom, of an inlet pipe for said tank, said pipe serving as a support for the bottom of the tank, a supply pipe entering the bottom of said inlet pipe and extending partially up into the same, and a blow-off valve arranged in the bottom of said inlet pipe.

8. The combination with a water tank, having a substantially hemi-ellipsoidal bottom, of an inlet pipe therefor, said pipe serving as a support for the bottom of said tank, a supply pipe entering said inlet pipe, a blow-off valve arranged in the bottom of said inlet pipe, and means for operating said blow-off valve from the top of said tank.

9. The combination with a water tank, having a substantially hemi-ellipsoidal bottom, of an inlet pipe for said tank, said pipe serving as a support for the bottom of said tank, and a discharge pipe leading from the top of said inlet pipe.

10. The combination with a tank, having a substantially hemi-ellipsoidal bottom, of an inlet pipe for said tank, said pipe also serving as a support for said bottom, a discharge pipe entering said inlet pipe at a point near the top thereof, a valve for maintaining said discharge pipe normally closed, and means for operating said valve from the outside of said tank.

11. The combination with a water tank, of an inlet pipe for said tank, said pipe serving as an additional support for the bottom of the tank and as a settling basin.

12. The combination with a water tank, of an inlet pipe for said tank, said pipe serving as a support for the bottom of the tank and as a settling basin, a supply pipe entering the bottom of said inlet pipe and extending partially up into the same, and a blow-off valve arranged in the bottom of said inlet pipe.

13. The combination with a water tank, of an inlet pipe therefor, said pipe serving as a support for the bottom of said tank and as a settling basin, a supply pipe entering said inlet pipe, a blow-off valve arranged in the bottom of said inlet pipe, and means for operating said blow-off valve from the top of said tank.

14. The combination with a water tank, of an inlet pipe therefor, said pipe serving as a support for the bottom of said tank and as a settling basin, a supply pipe entering said inlet pipe, a blow-off valve arranged in the bottom of said inlet pipe, means for operating said blow-off valve from the top of said tank, a discharge pipe entering said inlet pipe at a point near the top thereof, a valve for maintaining said discharge pipe normally closed, and means for operating said valve from the outside of said tank.

In witness whereof, I have hereunto subscribed my name in the presence of two witnesses.

GEORGE T. HORTON.

Witnesses:
K. I. SMALL,
V. J. PEIRCE.